United States Patent
Binding et al.

(10) Patent No.: US 7,024,413 B2
(45) Date of Patent: Apr. 4, 2006

(54) METHOD OF EXTERNALIZING LEGACY DATABASE IN ASN.1-FORMATTED DATA INTO XML FORMAT

(75) Inventors: Carl Binding, Thalwil (CH); Stefan G. Hild, Somers, NY (US); Daniela Bourges-Waldegg, Adliswil (CH); Kjell Beisland, Langnau (CH); Andreas Schade, Adliswill (CH)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 09/912,089

(22) Filed: Jul. 24, 2001

(65) Prior Publication Data

US 2002/0100027 A1 Jul. 25, 2002

(30) Foreign Application Priority Data

Jul. 26, 2000 (EP) .......................................... 00810665

(51) Int. Cl.
G06F 17/30 (2006.01)

(52) U.S. Cl. .................... 707/101; 707/102; 707/103 R; 715/513

(58) Field of Classification Search .................. 707/10, 707/100, 101, 102, 103 R; 715/513
See application file for complete search history.

(56) References Cited

U.S. PATENT DOCUMENTS 4,994,998 A * 2/1991 Anezaki ........................ 704/1
5,649,227 A * 7/1997 Anezaki et al. ................. 712/1
5,778,360 A * 7/1998 Sugita et al. .................... 707/4
6,256,778 B1 * 7/2001 Oliver ........................ 717/106
6,356,906 B1 * 3/2002 Lippert et al. ................ 707/10
6,356,955 B1 * 3/2002 Hollberg et al. ............ 709/315

OTHER PUBLICATIONS

Turau, Voker, "Making legacy data accessible for XML applications", FH Wiesbaden, University of Applied Sicence, Germany, 1999, pp. 1–11.*
Sue, Hoylen, "XER, a bridge between ASN.1 and XML", Distributed Systems Technology Centre, Australia, Jan. 12, 1999, pp. 1–10, downloaded at http://www.dstc.edu.au/Research/Projects/xer/xer–2.html on Jan. 7, 2004.*
Imamura et al. "Specification of translation Rule from ASN.1 Abstract Systax Definition to DTD", Jan. 2000, 35 pages; downloaded at http://www.trl.ibm.com/projects/xml/xss4j/docs/spec.txt on Jan. 7, 2004.*
"ExtensibleMarkupLanguage(XML)1.0:W3CRecommendation Feb. 10, 1998".
"E.H.Harold,XML ExtensibleMarkupLanguage(IDG Books1998)".

* cited by examiner

*Primary Examiner*—Srirama Channavajjala
*Assistant Examiner*—Khanh B. Pham
(74) *Attorney, Agent, or Firm*—David Aker; Richard M. Ludwin

(57) ABSTRACT

A computer-readable medium is encoded with a method of externalizing legacy data from a legacy database on a data resource into an Extensible Markup Language ("XML")-compliant format where the format is specified by an automatically generated XML meta-description, thus enabling access and processing of legacy data by XML-compliant applications.

26 Claims, 2 Drawing Sheets

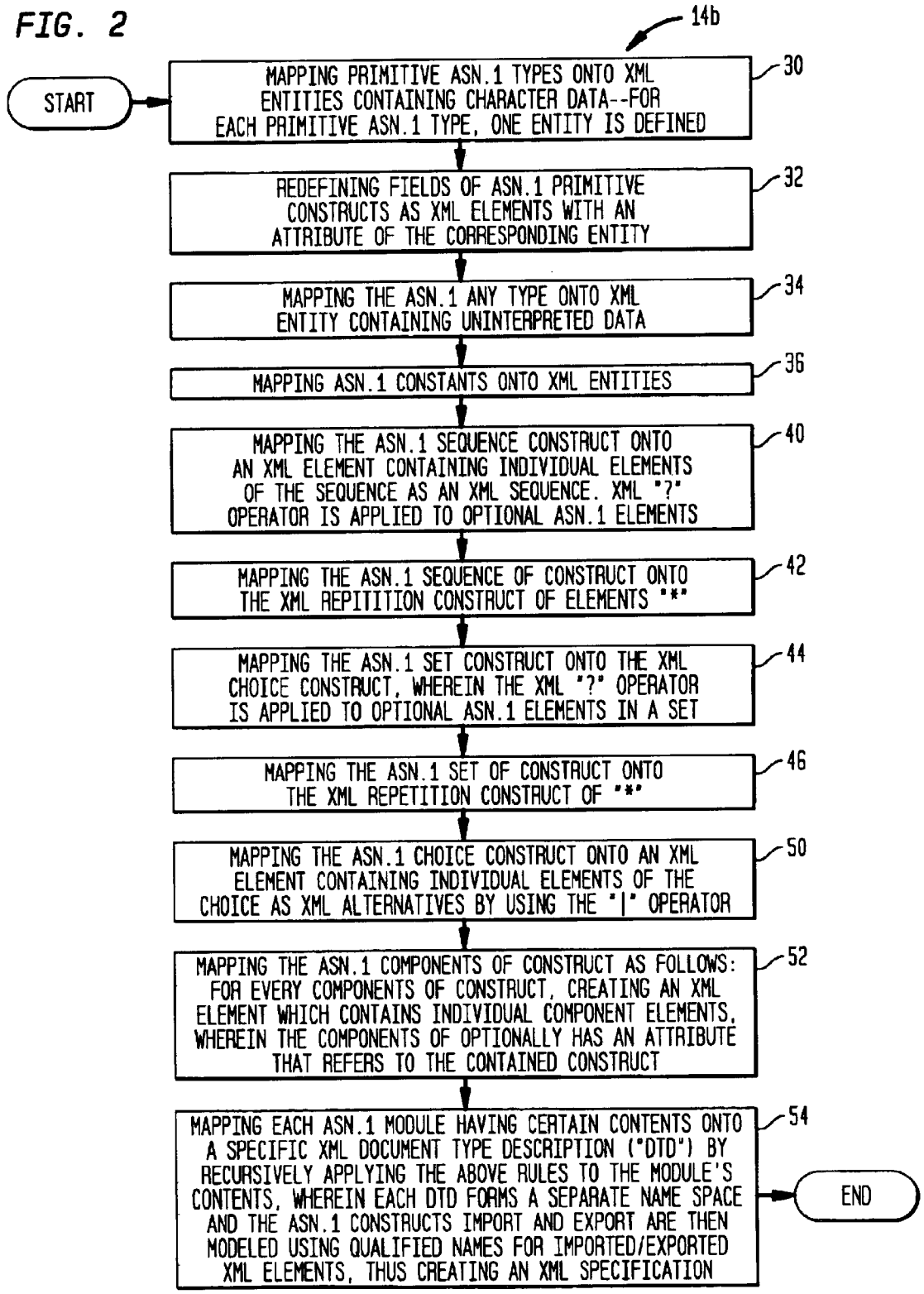

METHOD OF EXTERNALIZING LEGACY DATABASE IN ASN.1-FORMATTED DATA INTO XML FORMAT

FIELD OF THE INVENTION

This invention relates to the field of conversion of data from one format to another with a digital data processing device or devices. More particularly, the invention relates to a process of transforming legacy data in a legacy database into a Extensible Markup Language ("XML") format which is more useful for current applications.

BACKGROUND OF THE INVENTION

A forerunner of XML, HTML ("Hypertext Markup Language") was conceived as an easily understandable language for the exchange of scientific and other technical documents. HTML addressed the problem of SGML ("Standard Generalized Markup Language") complexity by specifying a small set of structural and semantic tags suitable for authoring relatively simple documents. In addition to simplifying the document structure, HTML added support for hypertext. Multimedia capabilities were added later.

In a brief period of time, HTML became very popular and quickly outgrew its original purpose. Since HTML's inception, many new elements have been devised for use within HTML (as a standard) and for adapting HTML to vertical, highly specialized, markets.

A severe shortcoming of HTML is its lack of data structuring mechanisms. HTML documents capture presentation and rendering aspects of marked-up documents, but the formalism does not lend itself to describe the structure of data which is exchanged between computing entities in typical client-server applications.

XML is a proposed standard for describing the structure of semi-structured data. The formalism supports the description of concrete mark-up languages which allow the specification of hierarchical (i.e. tree-like) data structures. Concrete mark-up languages can be specially adapted to particular application domains, such as the airline industry, finance industry, etc. where said concrete mark-up languages allow to model data entities per-use by these applications. XML can also be used to specify HTML as a concrete mark-up language. More information about XML can be found in "Extensible Markup Language (XML) 1.0:W3C Recommendation Feb. 10, 1998", http://www.w3.org/TR/REC-xml. and E. H. Harold, XML Extensible Markup Language, (IDG Books 1998).

XML, proposed by W3C (the World-Wide Web standardization body), has found wide-spread acceptance in the industry and is rapidly becoming the lingua franca for data representation/description mechanisms used throughout the World Wide Web. It is an open specification and several major industry leaders, among them Microsoft and IBM, are pushing for the use of XML formatted data exchanged between the various IT systems and sub-systems which make up an enterprise as well as a personal computing environment.

Abstract Syntax Notation ("ASN", currently version One, "ASN.1") serves a similar purpose: data structures can be described abstractly using the ASN.1 syntax. Its initial intention was to provide a scheme to specify the structure of data to be exchanged between computer systems in a system-independent, common representation. Therefore, ASN.1 also provides several concrete standardized transfer encodings such as "Basic Encoding Rules" (BER), "Definite Encoding Rules" (DER) etc. Due to the complexity of the ASN.1 data description language as well as the multiplicity of encoding rules, ASN.1 usage has been restricted to a limited set of IT applications, mainly related to IT security (e.g., directories, public key infrastructure).

Most data on the Internet is stored in legacy databases, many of which are using a relational data base model and in some cases ASN.1 encoding. For both cases, it is of commercial value to externalize such data into an XML compliant format in order to enable new Internet based applications.

For relational databases as well as for ASN.1 data, some work has been done to map actual data into XML compliant data formats. However, these transformations do not generate the meta-data description, embodied by an XML Document Type Definition (DTD). For example, one proposed translation for ASN.1 encoded data, published at http://asf.gils.net/xer/standard.html, only defines a mapping from one concrete ASN.1 data module onto one concrete XML data representation without generating the XML DTD.

What is needed, therefore, is an efficient method to externalize legacy data into an XML compliant format where the format is specified by an automatically generated XML meta-description (i.e. DTD). Such procedures will enable the access and processing of legacy data by new, Internet generation applications.

SUMMARY OF THE INVENTION

A computer-readable medium is encoded with a method of externalizing legacy data from a legacy database on a data resource into an Extensible Markup Language ("XML")-compliant format where the format is specified by an automatically generated XML meta-description, thus enabling access and processing of legacy data by XML-compliant applications. The method includes an exploration/adaptation step for exploration of the data resource, and a production step for generation of the XML data out of the legacy data. The method automates the data format mapping between legacy databases and an XML compliant representation of that data.

As another feature of the invention, the method allows conversion between ASN.1 specification and an XML meta data description or Document Type Description ("DTD") and the transformation of ASN.1 encoded data into XML compliant format adhering to said XML DTD.

In an advantage of the invention, accessing the relational data base model through an XML compliant data format allows companies such as banks, insurance companies, transportation enterprises, and department stores to open their databases to customers.

Any relational database can be accessed and its contents converted into a XML representation that is much more accessible to Internet applications, thus facilitating e-commerce.

BRIEF DESCRIPTION OF THE DRAWINGS

FIG. 2 is a flow diagram of a submethod that converts ASN.1 data into XML compliant data.

DETAILED DESCRIPTION OF THE PREFERRED EMBODIMENT

Figure 1:
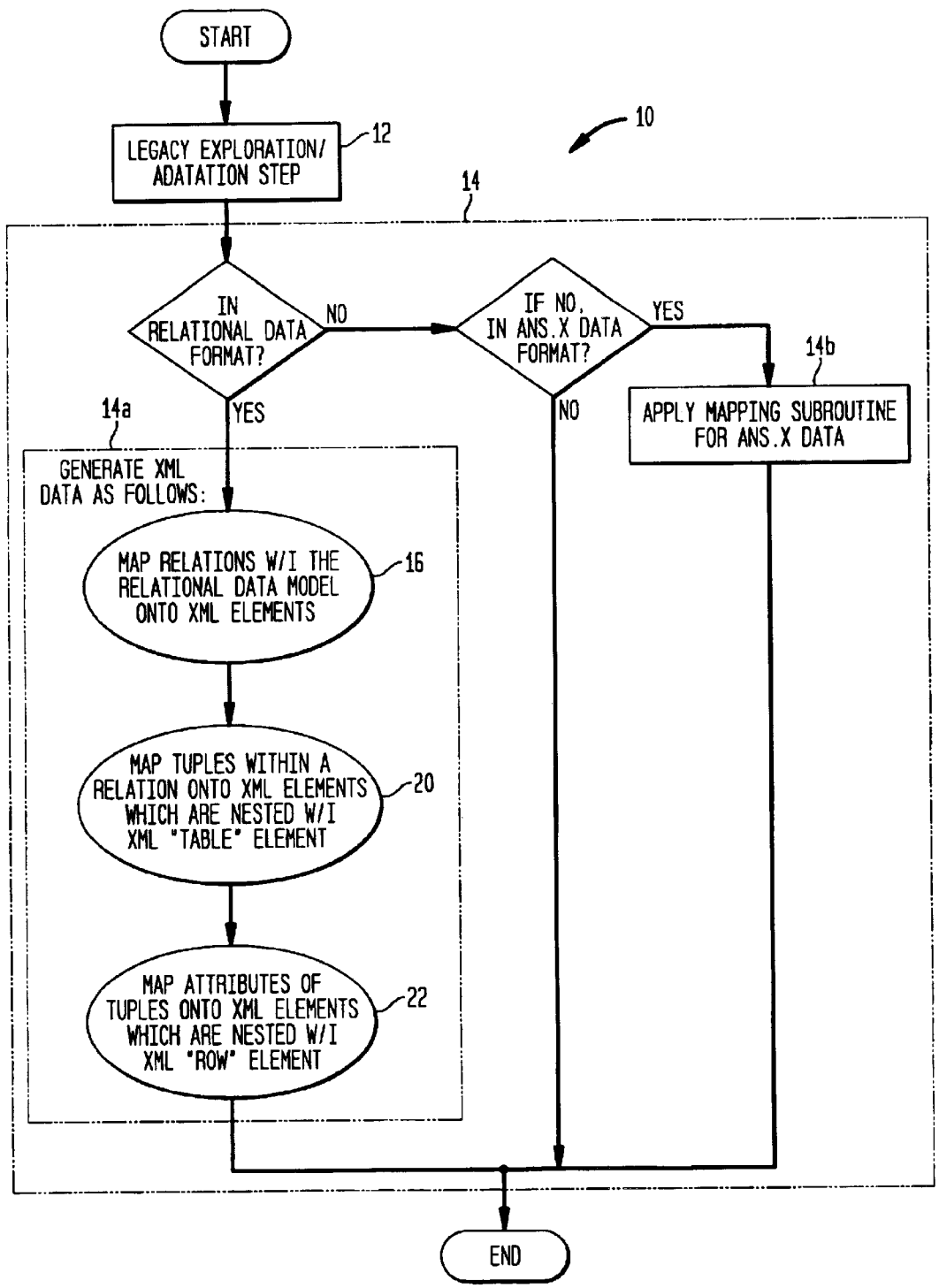
FIG. 1 is a flow diagram of the method of converting legacy data into an XML compliant data format.

Referring now to FIG. 1, the method 10 of the present invention is a method for externalizing legacy data from a legacy database on a data resource into an Extensible Markup Language ("XML")-compliant format where the format is specified by an automatically generated XML meta-description. This reformatting enables access and processing of legacy data by XML-compliant applications.

The method 10 automates the data format mapping between relational databases or ANS.X formatted databases and an XML compliant representation of that data, by performing the following steps: (1) an exploration/adaptation step 12 for exploration of the data resource, and (2) a mapping step 14 for generation of the XML data out of the legacy data.

The submethod 14a or 14b to be applied in the second mapping step 14 is determined by the data format of the legacy data. If the data is in relational data format, the submethod 14a is applied, and includes three substeps. In a first substep 16, relations (i.e. tables) within the relational data model are mapped onto XML elements. In a second substep 20, tuples (i.e., rows) within a relation are mapped onto XML elements which are nested within the XML "table" element; and in a third substep 22, attributes (i.e., columns) of tuples are mapped onto XML elements which are nested within the XML "row" element.

As a concrete example, consider relation T with attributes (a1, a2, . . . , an). This can be represented using the following XML data description:

```
<!ELEMENT TABLE_T(ROW_T)*>
<!ELEMENT ROW_T (a1, a2, .... An)>
<!ELEMENT a1 ....>
<!ELEMENT a2 ....>
<!ELEMENT a3 ....>
....
<!ELEMENT an ....>
```

In the exploration step 12, standardized database functions may be used to retrieve information on a database's data scheme. For example, the industry standard Open Database Connectivity ("ODBC") supports functions SQL Columns( ) allowing retrieval on the names and types of a table's attributes (columns).

Thus, it is possible to extract sufficient information from a database that allows the automatic generation of an XML DTD as outlined above and which is independent of the actual data stored in the database.

Referring now to FIGS. 1 and 2, when the exploration step 12 identifies ASN.1 formatted data, and the associated ASN.1 meta data specification, a conversion mapping submethod 14b is activated, which generates an XML meta data description (DTD) from ASN.1 meta data.

The mapping submethod 14b covers all ASN.1 constructs, both primitive and composite. Primitive constructs are, for example, Boolean, integer, bit string, etc. Composite constructs are combinations of primitive constructs, such as SET and SEQUENCE. Specifications for Abstract Syntax Notation One can be found in the CCITT Recommendation X.208 (1988). More detailed information about XML can be found in the article "W3C: Extensible Markup Language ("XML") Feb. 10, 1998, at http://www.w3.org/TR/REC-xml. References to such specifications are, of course, routine when dealing with computer programs or standardized constructs.

Referring now to FIG. 2, the mapping submethod 14b performs the following steps.

In a first step 30, primitive ASN.1 types are mapped onto XML entities containing character data ("CDATA"). For each primitive ASN.1 type, we define one entity, for example <!ENTITY % BOOLEAN "(true|false)">, <!ENTITY % INTEGER "CDATA"> and so on.

In a second step 32, fields of ASN.1 constructs, which are of a primitive ASN.1 type, become XML elements with an attribute of the corresponding entity. For example, if the method 10 finds a specification of an INTEGER element in ASN.1 (e.g. a INTEGER), it generates an XML element as follows:

```
<!ELEMENT a>,
<!ATTLIST a
    value INTEGER #REQUIRED
>
```

In a third step 34, the ASN.1 "ANY" type is mapped onto an XML entity containing un-interpreted data ("PCDATA").

In a fourth step 36, the ASN.1 constants are mapped onto XML entities.

In a fifth step 40, the ASN.1 "SEQUENCE" construct is mapped onto an XML element containing the individual elements of the SEQUENCE as an XML sequence. Optional ASN.1 elements are handled with the XML "?" operator.

In a sixth step 42, the ASN.1 "SEQUENCE OF" construct is mapped onto the XML repetition construct of base elements "*". The ASN.1 required ordering of SEQUENCE OF is implicit through the ordering with the repetition indicated via XML's "*" operator.

In a seventh step 44, the ASN.1 "SET" construct is mapped onto the XML choice construct. Optional ASN.1 elements in a SET are handled through the "?" operator.

In an eighth step 46, the ASN.1 "SET OF" construct is mapped onto the XML repetition construct of "*".

In a ninth step 50, the ASN.1 "CHOICE" construct is mapped onto an XML element containing the individual elements of the CHOICE as XML alternatives by using the "|" operator. In a tenth step 52, the ASN.1 "COMPONENTS OF" construct is mapped as follows:

For every COMPONENTS OF construct, an XML element is created which contains the individual component elements.

The XML construct for the ASN.1 "COMPONENTS OF [ASN.1 Construct]" expression optionally has an attribute that refers to the contained construct. Thus, an ASN.1 construct such as

```
B:=SEQUENCE {a INTEGER, b OCTET STRING};
A:=SEQUENCE {COMPONENTS OF B, c UNIVERSAL TIME}
Becomes the XML DTD specification
<!ELEMENT ComponentsOf_B (a, b)>
<!ATTLIST ComponentsOf_B
    origin CDATA #REQUIRED
>
<!ELEMENT A (ComponentsOf_B, c)>
```

This backward reference to the component container is necessary to avoid loss of information contained in the ASN.1 meta-data description.

In an eleventh step 54, each ASN.1 module is mapped onto a specific XML DTD by recursively applying the above rules to the module's contents. Each DTD forms a separate name space. The ASN.1 constructs IMPORT and EXPORT can then be modeled using qualified names for imported/exported XML elements.

In order to perform a lossless mapping (in that no information is lost in the mapping) onto XML, the submethod 14b can insert ASN.1 tags into the XML specification by including either TAG elements or three TAG attributes in the XML specification. XML "TAG" elements use an attribute to indicate their policy, i.e., implicit or explicit, their nature, i.e., universal, application-wide, context-specific, or private-use and the tag's value. XML tag attributes in a separate name-space asn are ASN:policy (EXPLICIT or IMPLICIT), ASN:class (UNIVERSAL, APPLICATION, CONTEXT, PRIVATE), and ASN:tag containing the original ASN.1 tag value. Note that the preservation of tagging information is only necessary for a lossless mapping and can therefore be considered optional.

An important assumption that has been made until now is that names are unique. This can be achieved by flattening the nested name structure of any ASN.1 construct through concatenating the ASN.1 names. For example, B:=SEQUENCE {a INTEGER, b OCTET STRING} would generate XML element names B, B_a, and B_b.

The above handling of COMPONENTS OF guarantees lossless mapping. However, ASN.1 encoders ignore that information and thus it is conceivable to also omit this information when defining the XML mapping. The above example would simply become <!ELEMENT A (B_a, B_b, c)>

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A method of mapping data formatted according to an Abstract Syntax Notation ("ASN.1") data model into an Extensible Markup Language ("XML") compliant data format, the method including an exploration/adaptation step for exploration of legacy data in a legacy database on a data resource, and a production step for generation of XML data out of the legacy data, wherein the method performs data format mapping between the legacy database and an XML-compliant representation of that data, and wherein the data format mapping takes ASN.1 constructs, and performs the following a steps;
   (a) mapping primitive ASN.1 types onto XML entities containing character data, wherein, for each primitive ASN.1 type, one entity is defined;
   (b) redefining fields of ASN.1 constructs, which are of a primitive ASN.1 type, as XML elements with an attribute of the corresponding entity;
   (c) mapping the ASN.1 ANY type onto an XML entity containing uninterpreted data;
   (d) mapping ASN.1 constants onto XML entities;
   (e) mapping the ASN.1 SEQUENCE construct onto an XML element containing individual elements of the SEQUENCE as an XML sequence, wherein the XML "?" operator is applied to optional ASN.1 elements;
   (f) mapping the ASN.1 SEQUENCE OF construct onto the XML repetition construct of ELEMENTS "*";
   (g) mapping the ASN.1 SET construct onto the XML CHOICE construct, wherein the XML "?" operator is applied to optional ASN.1 elements in a SET;
   (h) mapping the ASN.1 SET OF construct onto the XML repetition construct of "*";
   (i) mapping the ASN.1 CHOICE construct onto an XML element containing individual elements of the CHOICE as XML alternatives by using the "|" operator;
   (j) mapping the ASN.1 COMPONENTS OF construct as follows:
      for every COMPONENTS OF construct, creating an XML element which contains individual component elements, wherein the COMPONENTS OF optionally has an attribute that refers to the contained construct; and
   (k) mapping each ASN.1 module having certain contents onto a specific XML Document Type Description by recursively applying the above rules to the module's contents, wherein each Document Type Description forms a separate name space and the ASN.1 constructs IMPORT and EXPORT are then modeled using qualified names for imported/exported XML elements, thus creating an XML specification.

2. The method of claim 1, wherein in the exploration step, standardized database functions are used to retrieve information on a database's data scheme.

3. The method of claim 1 wherein the data format mapping is automated between legacy databases and an XML-compliant representation of that data.

4. The method of claim 3, wherein the data format mapping covers all ASN.1 constructs, both primitive and composite.

5. The method of claim 1 wherein an XML Document Type Definition conversion between either of the group and an XML-compliant format is made.

6. The method of claim 1, wherein in order to perform a lossless mapping onto XML, further inserting ASN.1 tags into the XML specification by including TAG element and three TAG attributes in the XML specification.

7. The method at claim 6, wherein the XML TAG elements use an attribute to indicate their policy, their nature, and value of the tag and wherein, an additional attribute indicate whether IMPLICIT or EXPLICIT ASH.1 tagging has been used.

8. The method of claim 7, wherein additional attributes are included in the XML specification, wherein XML tag attributes in a separate name-space Abstract Syntax Notation are ASN:policy, ASN:class, and ASN:tag containing the original ASN.1 tag value.

9. A method that automates the data format mapping between data in a legacy database on a data resource formatted according to an Abstract Syntax Notation (ASN.1) data model and Extensible Markup Language ("XML")-compliant representations of that data, wherein the method comprises:
   (1) an exploration/adaptation step for exploration of the data resource, and
   (2) a mapping step for generation of XML data out of the legacy data wherein the data format mapping takes ASN.1 constructs, and performe the following steps:
      (a) mapping primitive ASN.1 types onto XML entities containing character data, wherein, for each primitive ASN.1 type, one entity is defined;
      (b) redefining fields of ASN.1 constructs, which are of a primitive ASN.1 type, as XML elements with an attribute of the corresponding entity;

(c) mapping the ASN.1 ANY type onto an XML entity containing uninterpreted data;

(d) mapping ASN.1 constants onto XML entities;

(e) mapping the ASN.1 SEQUENCE construct onto an XML element containing individual elements of the SEQUENCE as an XML sequence, wherein the XML "?" operator is applied to optional ASN.1 elements;

(f) mapping the ASN.1 SEQUENCE OF construct onto the XML repetition construct of ELEMENTS "*";

(g) mapping the ASN.1 SET construct onto the XML CHOICE construct, wherein the XML "?" operator is applied to optional ASN.1 elements in a SET;

(h) mapping the ASN.1 SET OF construct onto the XML repetition construct of "*";

(i) mapping the ASN.1 CHOICE construct onto an XML element containing individual elements of the CHOICE as XML alternatives by using the "|" operator;

(j) mapping the ASN.1 COMPONENTS OF construct as follows:
for every COMPONENTS OF construct, creating an XML element which contains individual component elements, wherein the COMPONENTS OF optionally has an attribute that refers to the contained construct; and (k) mapping each ASN.1 module having certain contents onto a specific XML Document Type Description by recursively applying the above rules to the module's contents, wherein each Document Type Description forms a separate name space and the ASN.1 constructs IMPORT and EXPORT are then modeled using qualified names for imported/exported XML elements, thus creating an XML specification.

10. The method of claim 9 wherein the mapping step includes the following substeps:

(l) mapping relations, such as tables, within the relational data model onto XML elements including a "table" and a "row" element;

(m) mapping tuples, such as rows, within a relation onto XML elements which are nested within the XML "table" element; and (n) mapping attributes of tuples onto XML elements which are nested within the XML "row" element.

11. The method of claim 9, wherein in order to perform a lossless mapping onto XML, further inserting ASN.1 tags into the XML specification by including one TAG element and three TAG attributes in the XML specification.

12. The method of claim 11, wherein the XML TAG elements use an attribute to indicate their policy, their nature, and value of the tag and wherein, an additional attribute indicates whether IMPLICIT or EXPLICIT ASN.1 tagging has been used.

13. The method of claim 12 wherein additional attributes are included in the XML specification, wherein XML tag attributes in a separate name-space Abstract Syntax Notation are ASN:policy, ASN:class, and ASN:tag containing the original ASN.1 tag value.

14. A computer-readable medium encoded with a method of mapping data formatted according to an Abstract Syntax Notation ("ASN.1") data model into an Extensible Markup Language ("XML") compliant data format, the method including an exploration/adaptation step for exploration of legacy data in a legacy database on a data resource, and a production step for generation of XML data out of the legacy data, wherein the method performs data format mapping between the legacy database and an XML-compliant representation of that data, and wherein the format mapping takes ASN.1 constructs, and performs the following a steps;

(a) mapping primitive ASN.1 types onto XML entities containing character data, wherein, for each primitive ASN.1 type, one entity is defined;

(b) redefining fields of ASN.1 constructs, which are of a primitive ASN.1 type, as XML elements with an attribute of the corresponding entity;

(c) mapping the ASN.1 ANY type onto an XML entity containing uninterpreted data;

(d) mapping ASN.1 constants onto XML entities;

(e) mapping the ASN.1 SEQUENCE construct onto an XML element containing individual elements of the SEQUENCE as an XML sequence, wherein the XML "?" operator is applied to optional ASN.1 elements;

(f) mapping the ASN.1 SEQUENCE OF construct onto the XML repetition construct of ELEMENTS "*";

(g) mapping the ASN.1 SET construct onto the XML CHOICE construct, wherein the XML "?" operator is applied to optional ASN.1 elements in a SET;

(h) mapping the ASN.1 SET OF construct onto the XML repetition construct of "*";

(i) mapping the ASN.1 CHOICE construct onto an XML element containing individual elements of the CHOICE as XML alternatives by using the "|" operator;

(j) mapping the ASN.1 COMPONENTS OF construct as follows:
for every COMPONENTS OF construct, creating an XML element which contains individual component elements, wherein the COMPONENTS OF optionally has an attribute that refers to the contained construct; and (k) mapping each ASN.1 module having certain contents onto a specific XML Document Type Description by recursively applying the above rules to the module's contents, wherein each Document Type Description forms a separate name space and the ASN.1 constructs IMPORT and EXPORT are then modeled using qualified names for imported/exported XML elements, thus creating an XML specification.

15. The medium of claim 14, wherein in the exploration step, standardized database functions are used to retrieve information on a database's data scheme.

16. The medium of claim 14 wherein the data format mapping is automated between legacy databases and an XML-compliant representation of that data.

17. The medium of claim 16, wherein the data format mapping covers all ASN.1 constructs, both primitive and composite.

18. The medium of claim 14, wherein in order to perform a lossless mapping onto XML, further inserting ASN.1 tags into the XML specification by including one TAG element and three TAG attributes in the XML specification.

19. The medium of claim 18, wherein the XML TAG elements use an attribute to indicate their policy, their nature, and value of the tag and wherein, an additional attribute indicate whether IMPLICIT or EXPLICIT ASN.1 tagging has been used.

20. The medium of claim 19 wherein additional attributes are included in the XML specification, wherein XML tag attributes in a separate name-space Abstract Syntax Notation are ASN:policy, ASN:class, and ASN:tag containing the original ASN.1 tag value.

21. The medium of claim 13 wherein an XML Document Type Definition conversion between either of the group and an XML-compliant format is made.

22. A medium that automates the data format mapping between data in a legacy database on a data resource formatted according to an Abstract Syntax Notation data model and Extensible Markup Language ("XML")-compliant representations of that data, wherein the method comprises:

an exploration/adaptation step for exploration of the data resource, and a mapping step for generation of XML data out of the legacy data, and wherein the data format mapping takes ASN.1 constructs, and performe the following steps;

(a) mapping primitive ASN.1 types onto XML entities containing character data, wherein, for each primitive ASN.1 type, one entity is defined;

(b) redefining fields of ASN.1 constructs, which are of a primitive ASN.1 type, as XML elements with an attribute of the corresponding entity;

(c) mapping the ASN.1 ANY type onto an XML entity containing uninterpreted data;

(d) mapping ASN.1 constants onto XML entities;

(e) mapping the ASN.1 SEQUENCE construct onto an XML element containing individual elements of the SEQUENCE as an XML sequence, wherein the XML "?" operator is applied to optional ASN.1 elements;

(f) mapping the ASN.1 SEQUENCE OF construct onto the XML repetition construct of ELEMENTS "*";

(g) mapping the ASN.1 SET construct onto the XML CHOICE construct, wherein the XML "?" operator is applied to optional ASN.1 elements in a SET;

(h) mapping the ASN.1 SET OF construct onto the XML repetition construct of "*";

(i) mapping the ASN.1 CHOICE construct onto an XML element containing individual elements of the CHOICE as XML alternatives by using the "|" operator;

(j) mapping the ASN.1 COMPONENTS OF construct as follows:

for every COMPONENTS OF construct, creating an XML element which contains individual component elements, wherein the COMPONENTS OF optionally has an attribute that refers to the contained construct; and (k) mapping each ASN.1 module having certain contents onto a specific XML Document Type Description by recursively applying the above rules to the module's contents, wherein each Document Type Description forms a separate name space and the ASN.1 constructs IMPORT and EXPORT are then modeled using qualified names for imported/exported XML elements, thus creating an XML specification.

23. The medium of claim 22 wherein the mapping step includes the following substeps:

(l) mapping relations within the relational data model onto XML elements including a "table" and a "row" element;

(m) mapping tuples within a relation onto XML elements which are nested within the XML "table" element; and (n) mapping attributes of tuples onto XML elements which are nested within the XML "row" element.

24. The medium of claim 22 wherein, in order to perform a lossless mapping onto XML, further inserting ASN.1 tags into the XML specification by including one TAG element and three TAG attributes in the XML specification.

25. The medium of claim 24, wherein the XML TAG elements use an attribute to indicate their policy, their nature, and value of the tag and wherein, an additional attribute indicates whether IMPLICIT or EXPLICIT ASN.1 tagging has been used.

26. The medium of claim 25 wherein additional attributes are included in the XML specification, wherein XML tag attributes in a separate name-space Abstract Syntax Notation are ASN:policy, ASN:class, and ASN:tag containing the original ASN.1 tag value.

* * * * *